INVENTOR
WILLIAM MARION HOFFMAN

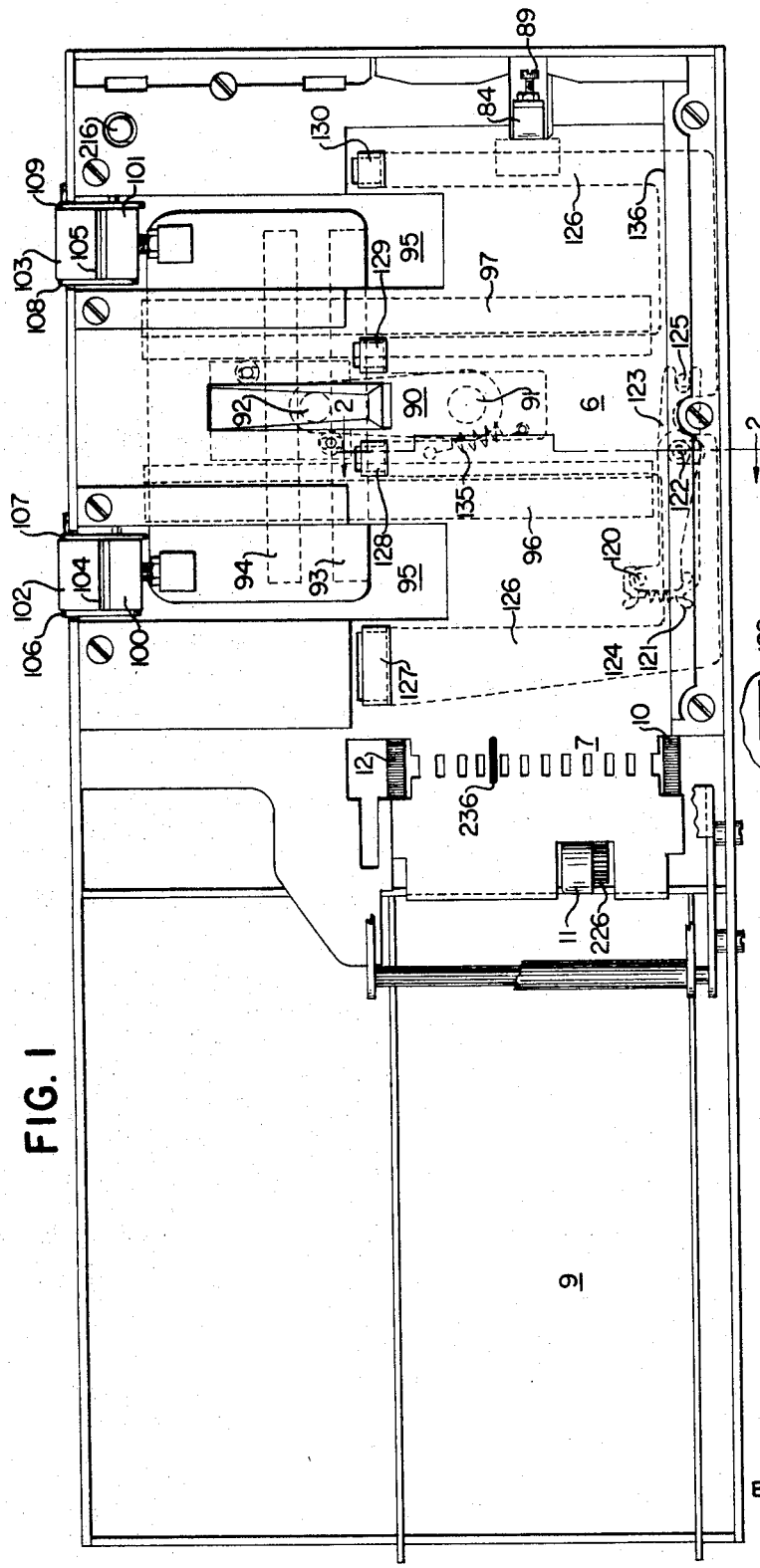
INVENTOR
WILLIAM MARION HOFFMAN
BY *Louis A. Kline*
HIS ATTORNEY

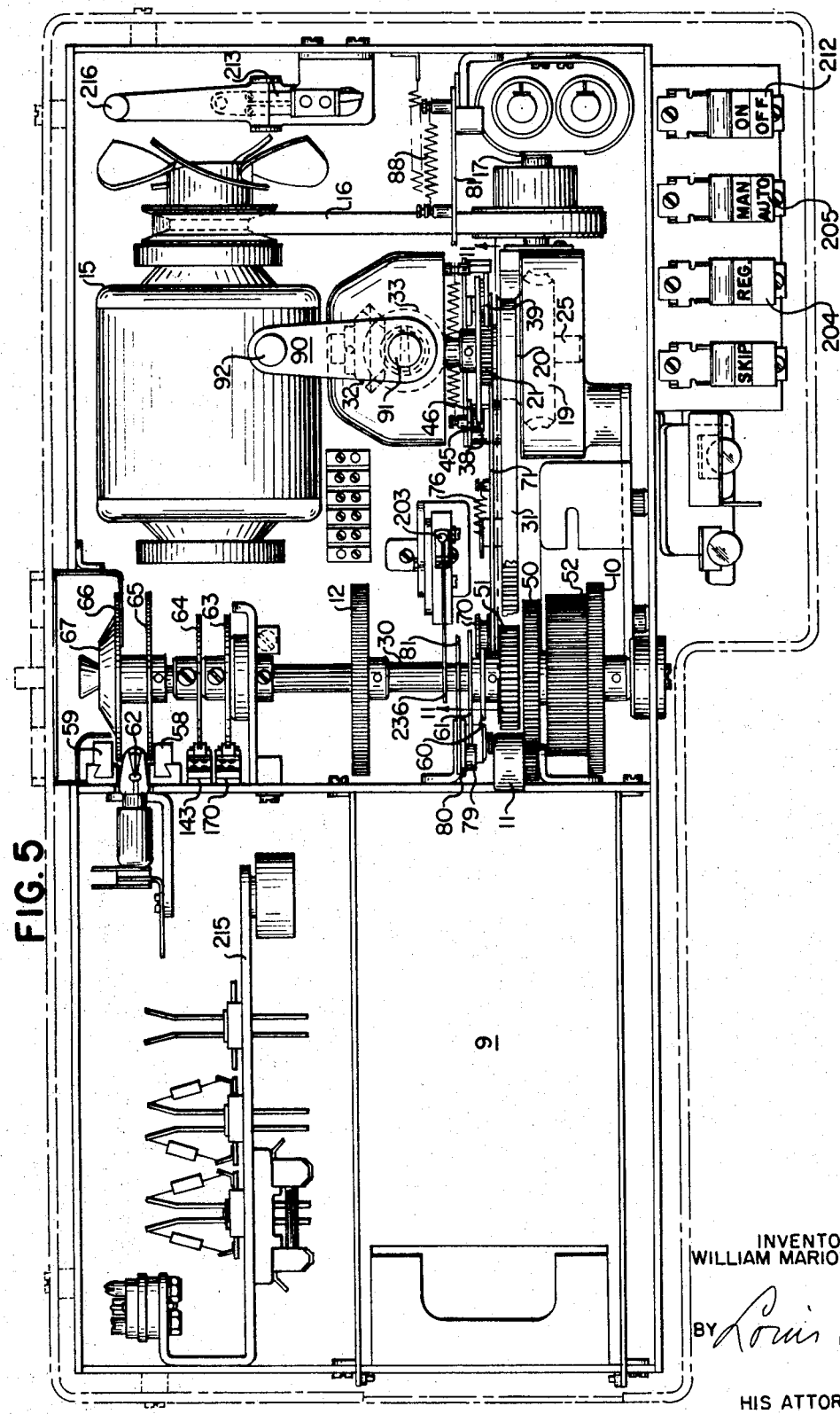

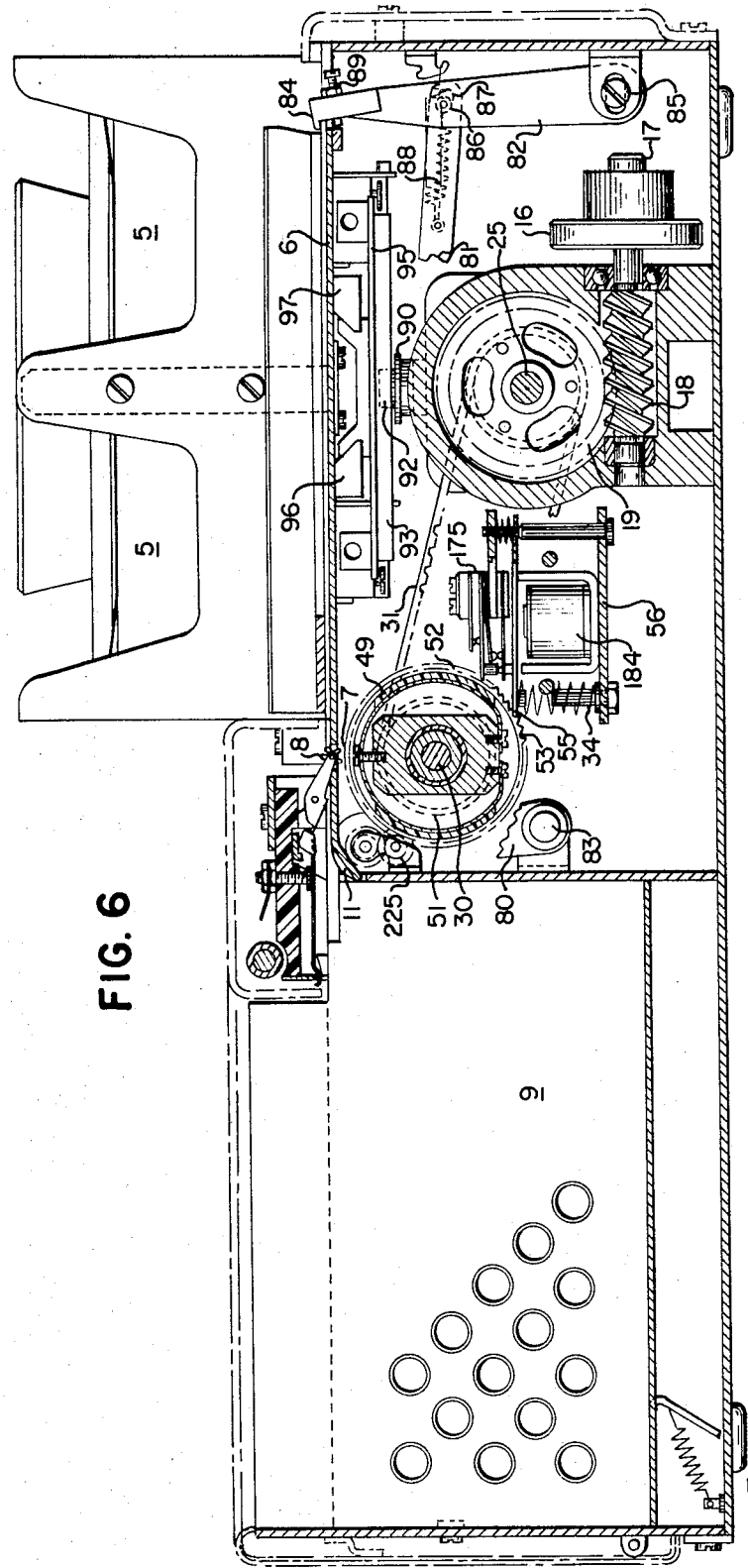

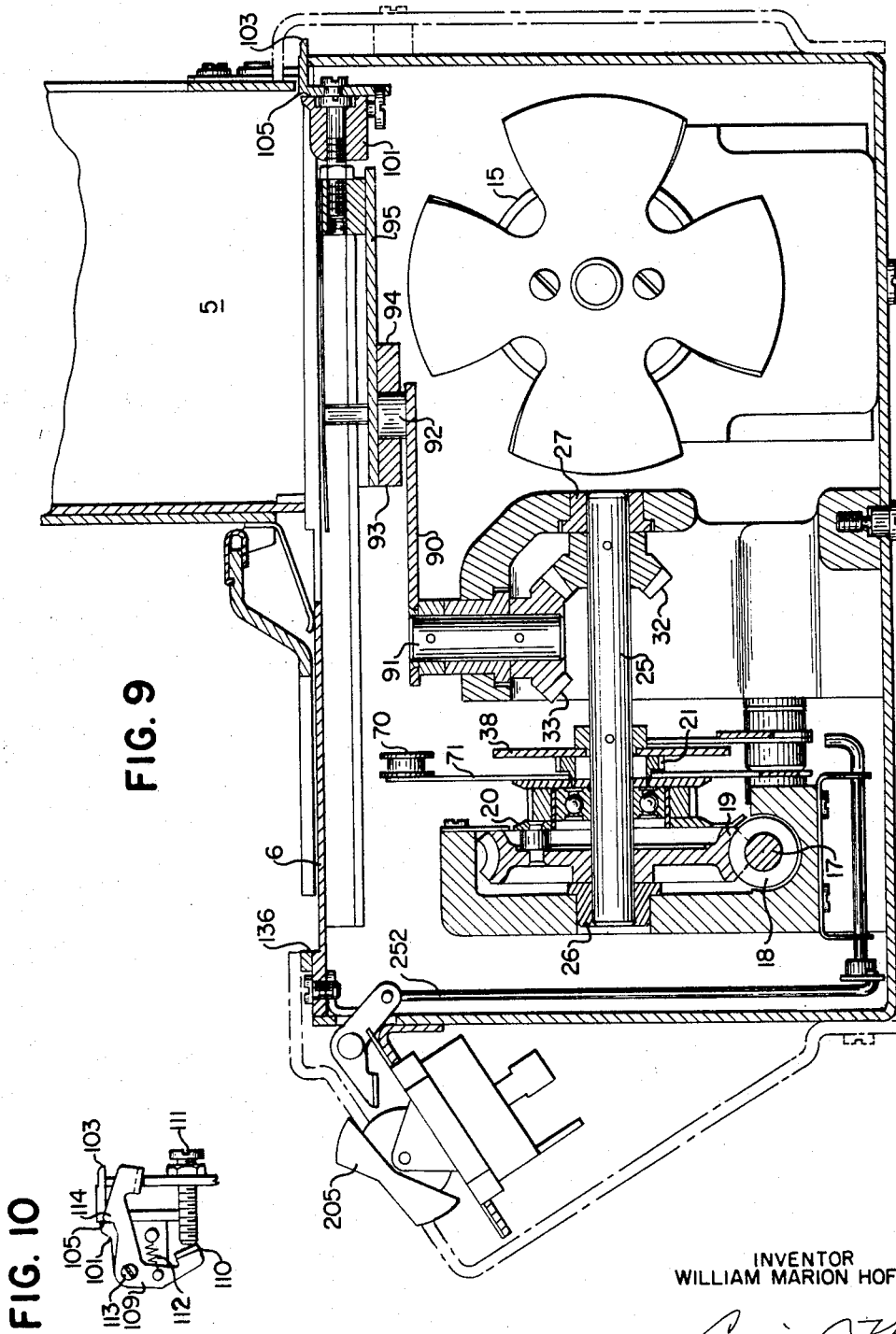

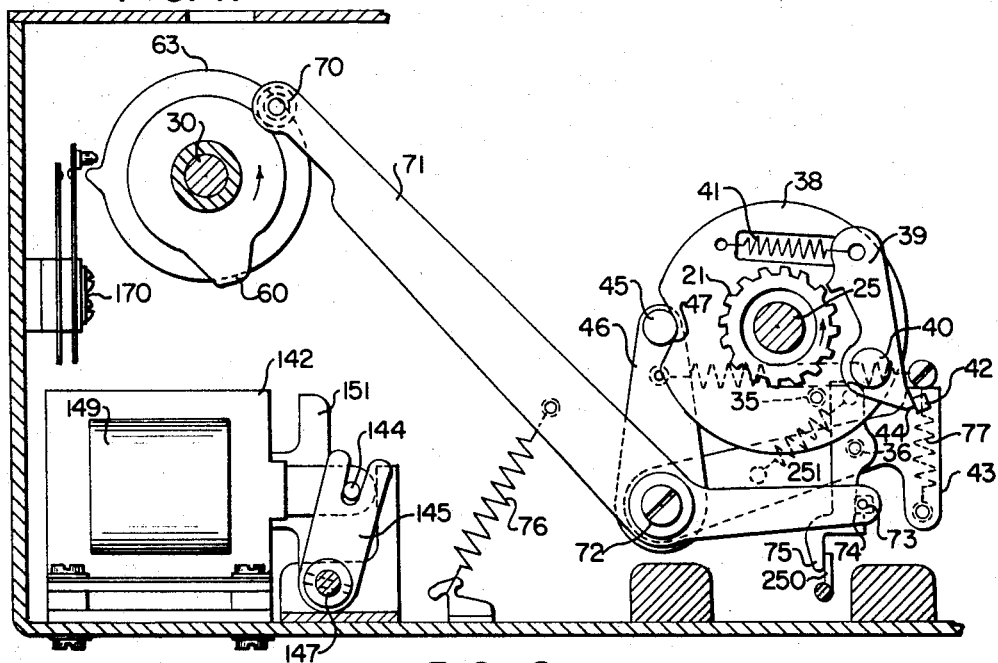
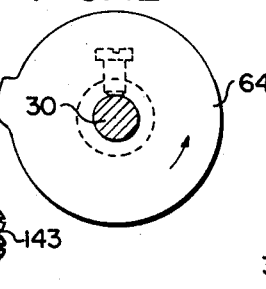
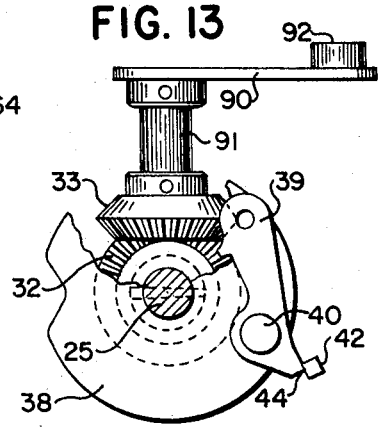
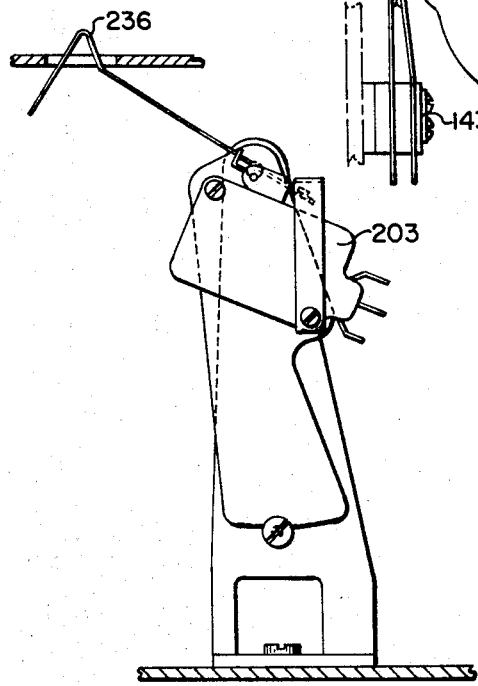

BY

HIS ATTORNEY

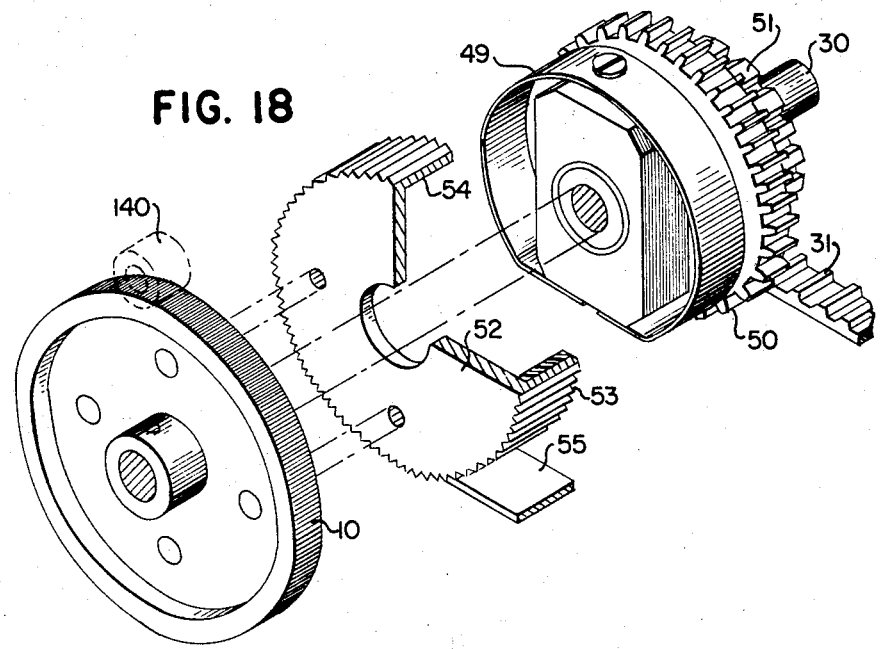
FIG. 18
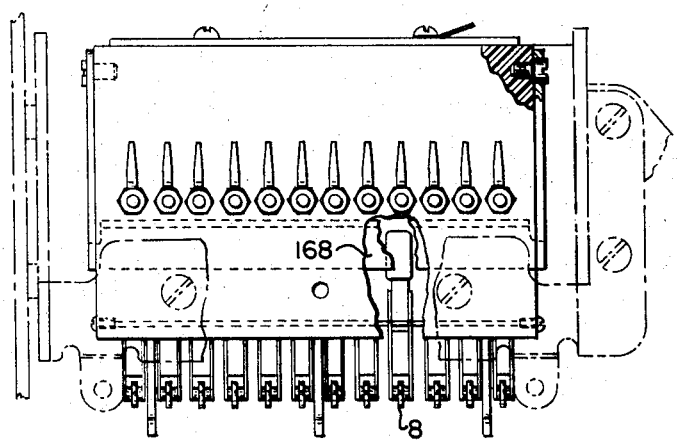
FIG. 19
FIG. 20
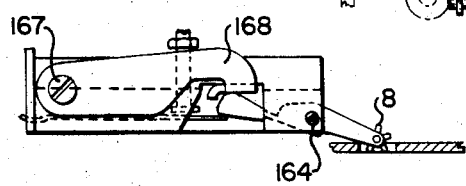

FIG. 21
FIG. 22
FIG. 23
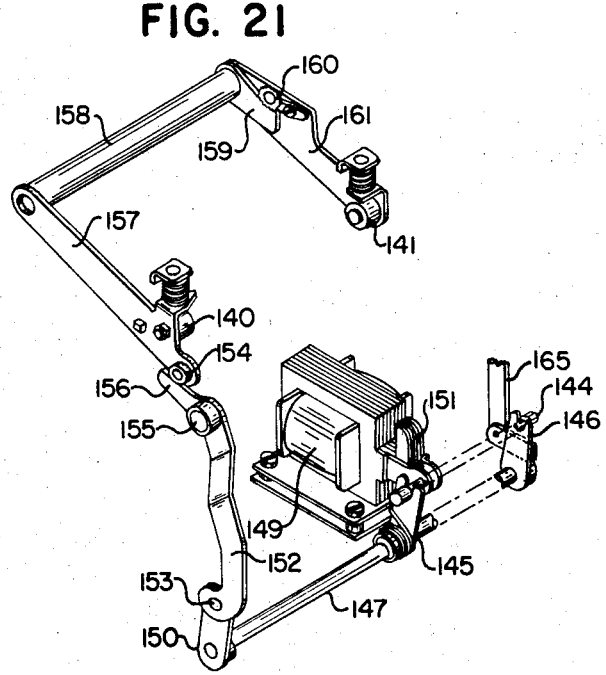
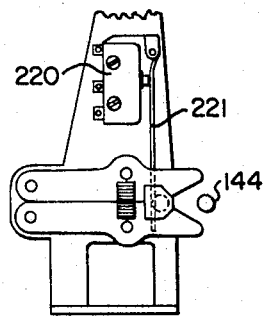
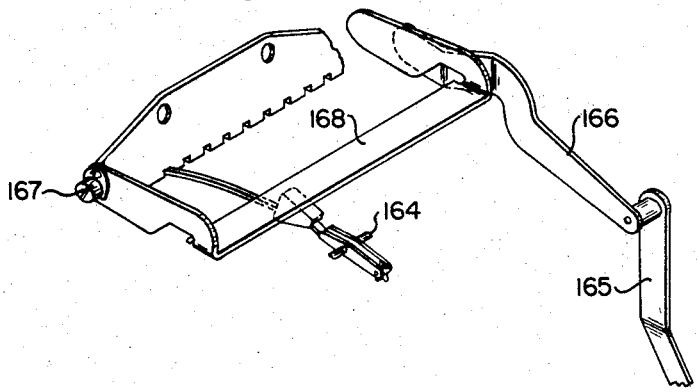

LOGIC TERM ESM SIGNAL OUTPUT TO TERMINAL 131 OF FIGURE 24

United States Patent Office 3,423,575
Patented Jan. 21, 1969

3,423,575
PERFORATED CARD READER
William M. Hoffman, Dayton, Ohio, assignor to The National Cash Register Company, Dayton, Ohio, a corporation of Maryland
Filed Jan. 21, 1965, Ser. No. 427,025
U.S. Cl. 235—61.11
Int. Cl. G06f 1/00
4 Claims

ABSTRACT OF THE DISCLOSURE

A perforated card reader which automatically feeds perforated cards from the bottom of a stack and directs them through a read station wherein the sequencing and timing are established by a series of cams and a card clock disc on a rotatable card control line which revolves one complete revolution per perforated card.

---

The present invention relates to perforated card readers which will automatically feed perforated cards from the bottom of a stack and direct them through a read station for selectively retrieving information recorded thereon in the form of perforations therethrough.

In the electronic data-processing art, information which is filed for future retrieval may be stored in the form of perforations through record cards. To retrieve this information, it is necessary that equipment adapted to "read" perforated record cards be developed.

It is, therefore, an object of this invention to provide an improved perforated card reader.

It is another object of this invention to provide an improved perforated card reader which is adapted to automatically feed perforated cards from the bottom of a stack and direct them through a "read" station.

In accordance with this invention, a perforated card reader is provided which automatically feeds perforated cards from the bottom of a stack and directs them through a read station wherein the sequencing and timing are established by a series of cams and a card clock disc on a rotatable card control line which revolves one complete revolution per perforated card.

Figure 15:
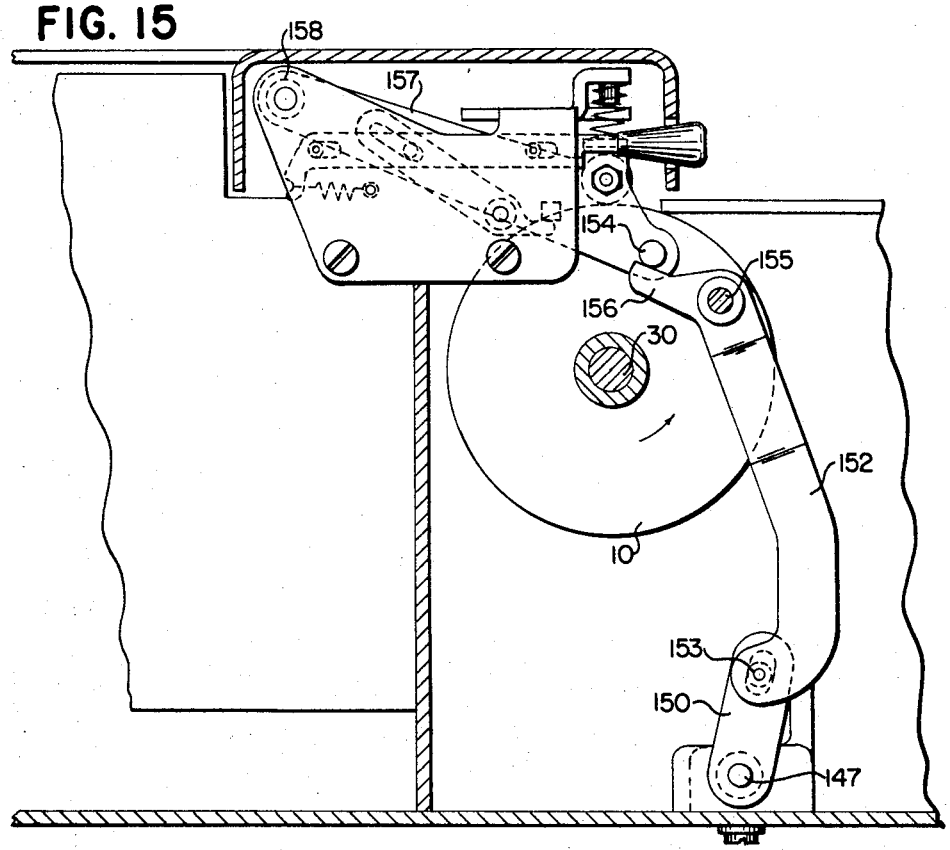
Figure 16:
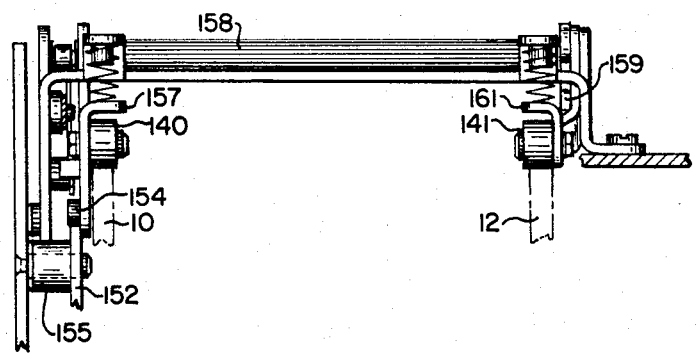
Figure 17:
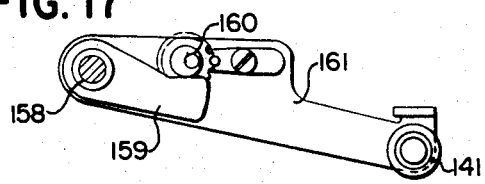
Figure 24:
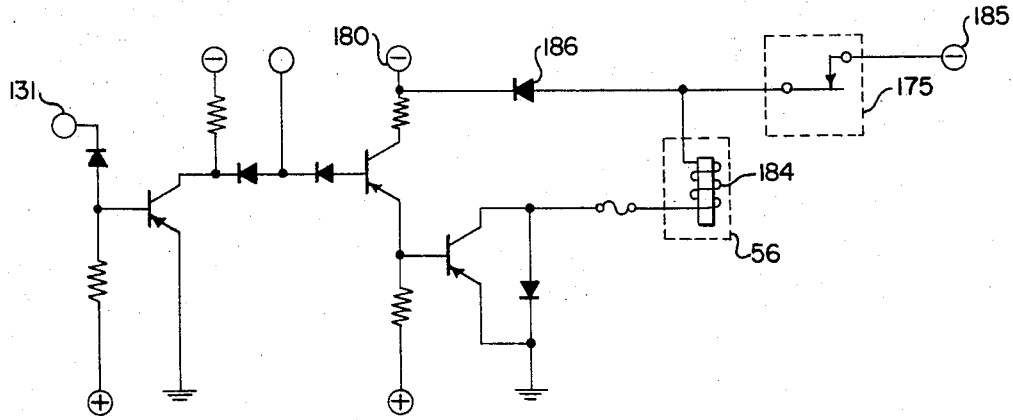
Figure 25:
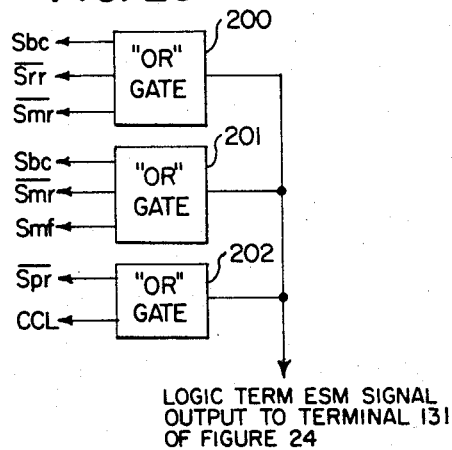
Figure 26:
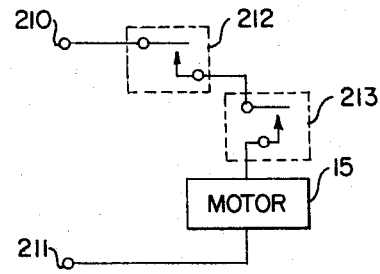
Figure 27:
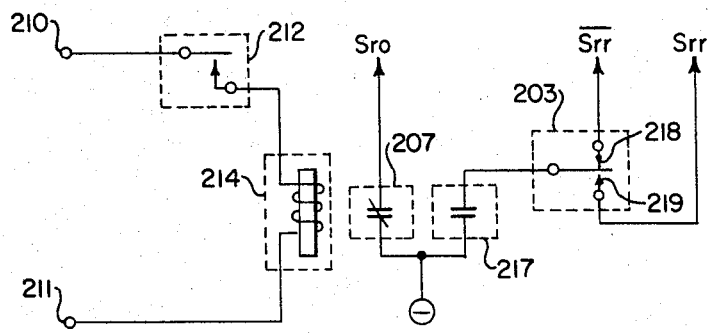
Figure 28:
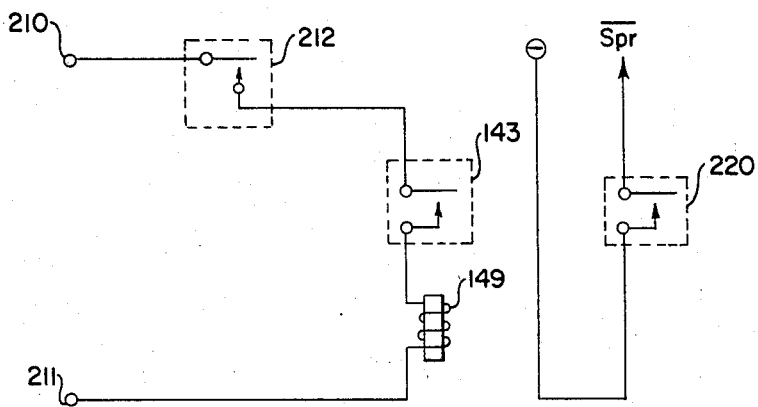
Figure 29:
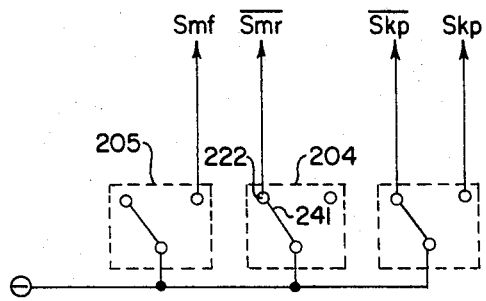

For a better understanding of the present invention, together with further objects, advantages, and features thereof, reference is made to the following description and accompanying drawings, in which:

FIGURE 1 is a top view of the card reader of this invention with the table in position, FIGURE 2 is an enlarged section view of a portion of FIGURE 1 taken along line 2—2 and looking in the direction of the arrows, FIGURE 3 is an enlarged fragmentary plan view of FIGURE 2, FIGURE 4 is an enlarged view of a portion of the card registration mechanism of FIGURES 1, 2, and 3, FIGURE 5 is a top view of the card reader of this invention with the table removed, FIGURE 6 is a front elevation view, partly in section, of the card reader of this invention with the front cover removed, FIGURE 7 is a detail front view of the card eject mechanism also shown in FIGURE 6, FIGURE 8 is a detail front view of another portion of FIGURE 6, FIGURE 9 is an end elevation view, partly in section, of the card reader of this invention with the end cover removed, FIGURE 10 is an enlarged detail of a portion of FIGURE 9, showing the arrangement for removing a single card from the bottom of a stack of cards, FIGURE 11 is a section view of a portion of FIGURE 5 taken along line 11—11 and looking in the direction of the arrows, FIGURE 12 is an enlarged side view of a cam and switch shown in plan in FIGURE 5, FIGURE 13 is a detail front view of a portion of the clutch assembly shown in FIGURE 9, FIGURE 14 is a detail view of the reader ready switch mounting, FIGURE 15 is a side view of the pressure roll lifting mechanism also shown in FIGURE 21, FIGURE 16 is a front view of the pressure roll lifting mechanism, FIGURE 17 is a detail view of a portion of FIGURE 21, FIGURE 18 is an exploded view of the card control line clutch assembly, FIGURE 19 is a top view of the star wheel sensing mechanism located at the read station as shown in FIGURE 6, FIGURE 20 is an end view of a portion of the star wheel sensor lifting mechanism shown in FIGURE 23, FIGURE 21 is a perspective view of the pressure roll lifting mechanism, FIGURE 22 is a detail view of the pressure roll position indicator switch and its mounting, FIGURE 23 is a perspective view of the star wheel sensor lifting mechanism, FIGURE 24 is a schematic diagram of the escapement magnet energizing circuit, FIGURE 25 is a schematic diagram of the escapement magnet control gate arrangement, FIGURE 26 is a schematic diagram of the motor energizing circuit, FIGURE 27 is a schematic diagram of the main relay energizing circuit, FIGURE 28 is a schematic diagram of the column 81 switch circuit, and FIGURE 29 is a schematic diagram of the register key circuit.

The punched card reader under consideration will automatically feed and read eightly-column punched cards and may be used as a peripheral input unit to an electronic data-processing system. The cards to be read are placed in a supply hopper 5 (FIGURES 6 and 9), from which they are automatically fed from the bottom of the stack onto a card table 6 (FIGURES 1, 6 and 9). After being transported to the card table 6, the card is registered into the read station 7 (FIGURES 1 and 6), through which it is driven by card drive wheels 10 and 12 (FIGURES 1 and 5), where each column is read by a star wheel type sensing assembly as the card is passed therethrough. One star wheel of this assembly is shown at 8 in FIGURE 6, and the star wheel sensor assembly is shown complete in FIGURE 19. The card is then directed into a receiving hopper 9 (FIGURES 1, 5, and 6) by a card ejection roll 11 (FIGURES 1, 5, and 6). This brief description is meant to be introductory only; the detail description of the mechanical portion of the card reader under consideration will now be set forth.

The power for this reader may be supplied by a conventional alternating current electric motor 15 (FIGURES 5 and 9) and is transmitted through a belt 16 to a worm gear shaft 17, to which is keyed a driving worm gear 18 (FIGURES 5, 6, and 9).

The driving worm gear 18 (FIGURE 6) drives a mating driven worm wheel 19 counter-clockwise (FIGURES 5, 6, and 9) when the driving motor 15 is energized. The driving worm wheel 19 (FIGURE 9), a pulley 20, and a clutch wheel 21 are brazed together and are free to rotate about a clutch drive shaft 25, which is rotatably supported at both ends by bearings 26 and 27.

The assembly comprising the driven worm wheel 19, the pulley 20, and the clutch wheel 21 (FIGURE 9), driven by the motor 15 through the driving worm gear 18, transmits power to a card control line 30 (FIGURE 5) through a pulley 20 driving belt 31 and to the card feed mechanism through the clutch wheel 21, which drives a ratchet clutch assembly and bevel gears 32 and 33 (FIGURE 9). The details of these drives will be explained later.

The card feed clutch assembly, most clearly shown in FIGURE 11, consists of the clutch wheel 21 and a clutch plate 38, keyed to the clutch drive shaft 25, to which is attached a clutch pawl 39, free to rotate about its pivot point 40. By engaging a tooth in the clutch wheel 21, the rotary motion of the clutch wheel 21 is transmitted to the clutch plate 38 through the clutch pawl 39. Since the clutch plate 38 is keyed to the clutch drive shaft 25, this motion is transferred to the clutch drive shaft, which rotates the bevel gear 32 (FIGURE 9), also keyed thereto. The rotation of the bevel gear 32 is, of course, transferred to the mating bevel gear 33, through which the card feed mechanism, to be explained in detail later, is operated.

It may be noted in FIGURE 11 that the clutch pawl 39 is urged counter-clockwise about its pivot 40 toward engagement with a tooth in the clutch wheel 21 by a spring 41. However, this counter-clockwise motion is prevented by a square trip stud 42, which is rigidly secured to a clutch arm 43 and which engages a tip 44 on the clutch pawl 39, as indicated. Therefore, the clutch pawl 39 is normally held out of engagement with a tooth in the clutch wheel 21, which revolves freely about the clutch drive shaft 25 along with the driven worm wheel 19 and the pulley 20, and the card feed mechanism is, of course, inoperative. At the precise time during the cycle of operation of the card reader under consideration that a card is to be fed from the bottom of the stack in the card hopper 5 to the table 6, the square trip stud 42 is moved out of engagement with the tip 44 upon the clutch pawl 39 in a manner to be explained later.

The card control line drive clutch assembly is detailed in the exploded view shown in FIGURE 18 and is composed of a sub-assembly including a clutch lining 49, an ejection roll drive cog 50, and a pulley 51, which accommodates the drive belt 31. This sub-assembly is free to rotate counter-clockwise about the card control line 30. An escapement wheel 52, having notches 53 about its outer periphery and a card drive wheel 10 pinned thereto, completes the card control line drive clutch assembly.

The card drive wheel 10 is keyed to the card control line 30 and is pinned to the escapement wheel 52; therefore, the card control line 30 revolves with the card drive wheel 10 and the escapement wheel 52. In normal operation, the clutch lining 49 is in frictional engagement with the inner peripheral surface 54 of the escapement wheel 52. Normally, engagement is sufficient to rotate the escapement wheel 52 and, of course, the card drive wheel 10 and the card control line 30 with the card control line drive clutch sub-assembly. Referring to FIGURE 6, however, it may be noted that the armature 55 of an escapement magnet 56 is positioned to engage one of the notches 53 about the outer periphery of the escapement wheel 52 when the escapement magnet 56 is de-energized. When the armature 55 of the escapement magnet 56 is engaging one of the notches 53 about the outer periphery of the escapement wheel 52, the escapement wheel 52 is locked in position, the force of the frictional engagement between the inner peripheral surface thereof and the lining 49 of the clutch sub-assembly is overcome, and, therefore, the escapement wheel 52, the card drive wheel 10, and the card control line 30 are not rotated therewith. Therefore, the action of the armature 55 of the escapement magnet 56 determines the time during which the card control line 30 is rotated. The operation of the escapement magnet 56 will be described in detail later during the electrical portion of this specification.

Referring to FIGURE 5, keyed to and rotated with the card control line 30 are a clutch trip cam 60, a card registration cam 61, a card drive wheel 12, two switch cams 63 and 64, a card clock disc plate 65, a program disc plate 66, and a program disc plate retainer 67. The function of the switch cams 63 and 64, the card clock disc plate 65, and the program disc plate 66 will be described in detail during the electrical portion of this specification. Briefly, the clutch trip cam 60 operates the mechanism which creates engagement of the card feed ratchet clutch assembly, previously described, to operate the card feed mechanism, and the registration cam 61 operates the card pusher mechanism, which registers the card from the card table 6 to the read station 7.

Referring to FIGURE 11, the operation of the linkage associated with the clutch trip cam 60 to create engagement of the card feed mechanism ratchet clutch assembly will be explained. As the card control line 30 and the clutch trip cam 60 are revolved counter-clockwise, the high portion, or lobe, of the clutch trip cam 60 engages the roller follower 70, rotatably mounted upon the clutch trip arm 71, moving the clutch trip arm 71 clockwise about its pivot point 72. As the portion of the clutch trip arm 71 to the right of the pivot point 72 moves in a substantially downward direction at this time, a square stud 73, rigidly secured thereto, engages the shoulder 74 of a trip pawl 75, moving this member downwardly. The trip pawl 75 is pivotally attached to the clutch arm 43; therefore, the clutch arm 43 also is moved clockwise about the pivot point 72. As the clutch arm 43 is moved clockwise, the square trip stud 42 thereon is moved out of engagement with the tip 44 of the clutch pawl 39, allowing the spring tension of the spring 41 to carry the dog of the clutch pawl 39 into engagement with one of the teeth of the clutch wheel 21. With this engagement, the clutch pawl 39 and the clutch plate 38, to which it is pivotally mounted, is revolved with the clutch wheel 21. With this condition, as the clutch plate 38 is revolved, the clutch drive shaft 25 and the bevel gear 32 are revolved therewith (FIGURES 9 and 13). As the bevel gear 32 is rotated with the clutch drive shaft 25 and the clutch plate 38, the card feed mechanism is operated in a manner to be explained later. As the lobe of the clutch trip cam 60 (FIGURE 11) passes beyond the roller follower 70 of the clutch trip arm 71, the clutch trip arm 71 is urged counter-clockwise about its pivot point 72 by the tension of a spring 76. This motion, of course, causes that portion of the clutch trip arm 71 to the right of the pivot point 72 to move in a generally upward direction, carrying the square stud 73 therewith. As the pressure of the square stud 73 is released from the shoulder 74 of the trip pawl 75 as the clutch trip arm 71 is urged counter-clockwise, the tension of a spring 77 urges the clutch arm 43 and the square trip stud 42, attached thereto, upwardly back to its normal position. As the clutch plate 38 and the clutch pawl 39 are carried around by the clutch wheel 21, the clutch trip pawl 44 again engages the square trip stud 42, thereby urging the clutch pawl 39 clockwise about its pivot point 40. The tension of the spring 41 is overcome, and the dog of the clutch pawl 39 is disengaged from the tooth in the clutch wheel 21, thereby releasing power to the card feed mechanism. Should the card control line 30 stop in a position in which the roller follower 70 of the clutch trip arm 71 is on the top of the lobe of the cam 60, the square stud 73 would hold the trip pawl 75 in the lowest position. In this position, the square trip stud 42 is also held out of position to engage the tip 44 of the clutch pawl 39. Should the reader be restarted under this condition, therefore, the dog of the clutch pawl 39 would not be disengaged from the tooth in the clutch wheel 21, and the clutch drive shaft 25 would continue to rotate. To provide for a release of the clutch under this condition, a stud 35 is secured to the clutch plate 38 and is positioned to engage the upper portion of the trip pawl 75. Upon the engagement of the stud 35 with the upper portion of the trip pawl 75, this pawl is urged clockwise about the pivot point 36. This action releases the shoulder 74 of the trip pawl 75 from the square stud 73 and permits the clutch arm 43 and the square trip stud 42 to return to the normal position, where the square trip stud 42 may engage the clutch pawl tip 44 and release the clutch assembly.

Referring to FIGURES 5, 6, and 7, the card registration mechanism will now be explained. Referring to FIGURE 8, a cam follower roller 79 engages the card registration cam 61 and is arranged to follow the contour thereof. The cam follower roller 79 is rotatably mounted upon a cam arm 80, which pivotally is attached to a card pusher link 81. The card pusher link 81 is flexibly connected to a card pusher arm 82, as shown in FIGURE 6. Extending upwardly through a slot in the card table 6 is a lipped block 84, which may be of nylon or other suitable material. The purpose of the block 84 is, of course, to engage the edge of any card which may be upon the card table 6 and to urge it in the direction toward the read station 7 as the card registration mechanism is operated by the card registration cam 61 and the associated linkage. As the card registration cam 61 revolves counter-clockwise with the card control line 30, the lobe of this cam moves the cam follower roller 79 to the left, which tends to rotate the cam 80 counter-clockwise about its pivot point 83. As the cam arm 80 is urged counter-clockwise, the card pusher link 81 is moved to the left, and this motion tends to rotate the card pusher arm 82 counter-clockwise about its pivot point 85. As the card pusher arm 82 begins counter-clockwise motion, the block 84 moves in a direction toward the read station 7. This motion, of course, moves a card on the table 6 in a direction toward the read station 7. It may be noted that the card pusher link 81 is flexibly connected to the card pusher arm 82 through a rivet 86, contained in an elongated slot 87 and that these two members are held under tension by a spring 88. With this arrangement, a considerable latitude is available for adjusting the block 84 by means of an adjusting screw assembly 89.

Upon the engagement of the clutch pawl 39 (FIGURE 11) with a tooth in the clutch wheel 21 upon the operation of the clutch trip arm 71 by the card registration cam 61 on the card control line 30, as previously described, the bevel gear 33 and the shaft 91 (FIGURE 13) are revolved by the bevel gear 32, which is, of course, driven by the now-rotating clutch drive shaft 25.

Referring to FIGURE 9, pinned to the shaft 91 and rotated therewith is a card feed arm 90, having a roller 92 rotatably attached to the opposite end. The roller 92 is located between two guide members 93 and 94, which are securely attached to a card feed slide 95. This arrangement is also shown in FIGURES 1 and 6. As may be seen in FIGURES 1 and 6, the card feed slide 95 is slidably mounted upon "V" ways, which are supported by slide rails 96 and 97. As the card feed arm 90 is revolved, the roller 92, located between the guide members 93 and 94, moves the card feed slide 95 toward the table 6 during the first half-revolution and returns it during the last half-revolution.

Carried by the card feed slide 95 are two card feed blocks 100 and 101 and two accompanying card feed plates 102 and 103, as shown in FIGURE 1. Knife edges 104 and 105 of the feed plates 102 and 103, respectively, engage the edge of the card at the bottom of the stack of cards in the hopper 5 and carry it along toward the table 6 with the card feed slide 95. The knife edges 104 and 105 are adjusted to be of sufficient height to engage the edge of only one card at a time. The knife edge 105, the feed block 101, and the feed plate 103 are shown in section in FIGURE 9.

Pivotally attached to both sides of each of the card feed blocks 100 and 101 are card feed bails 106, 107, 108, and 109 (FIGURE 1). The card feed bail 109 is shown in detail in FIGURE 10. As the card feed slide 95 continues toward the table 6, the edge corresponding to the edge 110 of the card feed bail 109 of all of the card feed bails will move away from their adjusting screws corresponding to the screw 111. Tension applied by springs on each, corresponding to the spring 112, will rotate the card feed bails counter-clockwise about their respective pivot points 113 and will carry the respective hook portions 114 up behind the card which has just been engaged by the knife edge 105 to insure its being fed onto the table 6 with the motion of the card feed slide 95.

As the card feed slide 95 nears complete movement toward the card table 6, it contacts a stud 120 (FIGURE 4) on an arm 121 and moves it forward. As the table contacts the stud 120 and moves it forward, the arm 121 is revolved counter-clockwise about its pivot point 122. The arm 123 is flexibly connected to the arm 121 by a spring 124 and, therefore, is also moved counter-clockwise about the pivot point 122 through the tension of the spring 124. As the arm 123 moves counter-clockwise, it forces a stud 125, engaged in a notch on the right-hand side thereof, in a direction opposite that of the card feed slide 95. The stud 125 is attached to a register slide 126, as shown in FIGURES 1 and 2, and, therefore, the register slide 126 is moved in a direction opposite that of the card feed slide 95. Attached to the register slide 126 are four register blocks 127, 128, 129, and 130. As the card register slide 126 is moved in a reverse direction, these card register blocks, which protrude through the table 6, are also moved in a reverse direction behind the card being carried out of the hopper 5 by the card feed slide 95 and the card feed bails 106, 107, 108, and 109.

As the card feed slide 95 is pulled in the reverse direction as the roller 92 on the card feed arm 90 begins the second half of its revolution, the pressure exerted against the stud 120 by the card feed slide 95 is released, and the card register slide 126 is urged toward the feed table by a spring 135 (FIGURES 2 and 3). As the spring 135 urges the card register slide 126 toward the card feed table 6, the stud 125, which is yoked by the arm 123, is also moved in a forward direction, which returns the assembly of arms 121 and 123 to their initial, or home, position. The register blocks 127, 128, 129, and 130 contact the card and fully position it upon the read table 6 against a stop 136 (FIGURE 9).

As the card feed slide 95 reaches its home position upon the completion of one revolution of the card feed arm 90, the tip 44 (FIGURE 11) of the clutch pawl 39 contacts the square stud 42 on the clutch arm 43. This disengages the dog of the clutch pawl 39 from the tooth of the drive wheel 21, and movement to the card feed mechanism is stopped. The roll 45 on the homing cam arm 46 moves in the dwell notch 47 of the clutch plate 38 and holds the clutch drive shaft 25 in the home position until reoperated.

In this manner, a card may be fed from the bottom of the stack in the hopper 5 and registered upon the table 6 preparatory to being registered in the read station 7 through the action of the card pusher arm 82 and the card register block 84 (FIGURES 1 and 6).

To insure that the card to be read is maintained in intimate contact with the card drive wheels 10 and 12 as they transport the card through the read station, a pair of pressure rolls 140 and 141 (FIGURE 16) are arranged to engage the respective card drive wheels 10 and 12. So that successive cards may be registered in the read station, it is necessary that both pressure rolls 140 and 141 and the star wheel sensing elements be raised, so that they do not interfere with the card registration operation, previously described. The location of this mechanism relative to the other parts of the reader is shown in FIGURES 15 and 16. The star wheel sensing assembly shown in FIGURE 19 is located between the pressure rolls.

To provide the power to raise these elements, a pressure roll solenoid 142 (FIGURES 11 and 21) is provided. This solenoid is energized through the closure of a pressure roll lift solenoid switch 143 (FIGURES 5 and 12) by the lift solenoid switch cam 64, which is keyed to the card control line 30. This energizing circuit is schematically set forth in FIGURE 28 and will be explained in detail later in the specification.

The mechanism which lifts the pressure rolls and the star wheels upon the energization of the lift solenoid 142 is illustrated in FIGURES 11, 15, 16, 17, 20, 21, and 23. The solenoid plunger pin 144 (FIGURE 21) engages a notch in each of solenoid actuator arm 145 and star wheel lift actuator arm 146, both of which are keyed to the actuator arm shaft 147. Also keyed to the left end of the actuator arm shaft, as viewed in the drawing, is a pressure roll lift actuator arm 150.

Upon the energization of the lift solenoid 142, its plunger 151 and the associated plunger pin 144 are pulled toward the solenoid coil 149, a motion which moves the top of the solenoid actuator arm 145, the actuator arm shaft 147, the star wheel lift actuator arm 146, and the pressure roll lift actuator arm 150 counter-clockwise. As the pressure roll lift actuator arm 150 is moved counter-clockwise, an operating arm 152, pivotally attached to the pressure roll lift actuator arm 150 at the point 153, is moved clockwise about its pivot point 155. The upper portion 156 of the operating arm 152 moves up against a roll 154, which is attached to a pressure roll arm 157, thereby raising this arm and the pressure roll 140 attached thereto. The pressure roll arm 157 has a hub 158, which is copper-brazed to another pressure roll arm 159. This arm, of course, is also raised and, through an eccentric 160, raises another pressure roll arm 161 and the pressure roll 141 attached. The eccentric 160 is included in this mechanism to provide a means for equalizing the pressure between the pressure roll arm 157 and the pressure roll arm 161.

The star wheel lift actuator arm 146 is also moved counter-clockwise, thereby moving a link 165, secured thereto, in a substantially downward direction. The opposite end of the link 165 is attached to a bail cam arm 166 (FIGURE 23), which is moved in a substantially downward direction with the link 165 about a shaft 167. Welded to the bail cam arm 166 is a switch opening bail 168, which moves clockwise about the shaft 167 against the rear of all of the switch arms of the star wheel sensors, thereby raising the star wheels up out of the path of the card to be registered into the read station 7 as they are pivoted counter-clockwise about the switch shaft 164.

Upon the de-energization of the coil 149 of the lift solenoid 142 when the lift solenoid switch cam 64 permits the lift solenoid switch 143 to open, the lift solenoid 142 relaxes, and the pressure rolls and the star wheel sensing units return to their original positions and are prepared to transport the card through the read station and read the card, respectively.

The location of the pressure roll lift solenoid 142 relative to the other portions of the reader under consideration is clearly shown in FIGURE 11, which is a section view of FIGURE 5 taken along the dashed lines 11—11 and looking in the direction of the arrows.

One revolution of the card control line 30 (FIGURE 5) transports one card completely through the read station, operates the card feed clutch assembly through the clutch trip cam 60 to operate the card feed mechanism to feed one card from the supply hopper 5, operates the card registration mechanism through the card registration cam 61 to register the card fed out of the supply hopper 5 to the read station 7, operates a column 81 switch 170, operates the compression roll lift solenoid switch 143 through the cam 64, provides card clock pulses for each column of the card to be read, and provides card field definition signals for each field on the card. From this it is apparent that virtually all of the timing and sequencing of operations to feed and read cards is controlled by the card control line 30.

As one revolution of the card control line 30 transports one card to be read through the read station 7, and since substantially all of the timing and sequencing of the various read operations are established by the card control line 30 during one revolution, as outlined in the next paragraph above, each angular position of the card control line 30 may be thought of as corresponding to one of the eighty columns of the card to be read. Therefore, in the interest of simplicity and clarity in this specification, the several angular positions of the card control line 30 will be referred to in respect to the column of the eighty-column card to which the position corresponds. This is particularly true in the description of the relative positions of the lobes of the clutch trip cam 60, the card registration cam 61, the lift solenoid switch cam 63, the column 81 switch cam 64, the card clock disc plate 65, which provides one card clock signal during the time each column of the card is in the read station, and the program disc plate 66, which carries the program card for creating card field definition signals, and to describe the position of the card control line 30 at any time during one complete revolution.

Although each of the cards to be read by this reader has only eighty columns, the card control line 30 will be thought of as having eighty-seven positions, the extra positions being used to provide enough time to eject the card just read, to register the next card to be read into the read station, and to allow the pressure rolls 140 and 141 to return to their original position and grip the card that has just been registered into the read station.

During one revolution of the card control line 30, it must be stopped at its home position, which corresponds to column 82, and it must be stopped momentarily at the time that the pressure roll lift solenoid 142 relaxes to permit the pressure rolls 140 and 141 to grip the newly-registered card in the read station. These stops are controlled by switching logic circuitry contained within the reader, and will be explained in detail later.

This card reader generates a clock signal that is used to indicate to the attached data processing system when a column of data is available from the punched card being read. This signal comes from a photo diode and works in conjunction with a clock card disc 65 (FIGURE 5) that has a striped pattern of opaque material on one side and which, of course, revolves with the card control line 30. A light bulb 62 is located between the card clock disc 65 and the program disc 66 and provides the energy to operate photo diodes 58 and 59. The strips of opaque material on the clock card disc 65 are arranged in such a manner that light from the bulb 62 strikes the photodiode 58 as each column of the card enters the read station 7, and is blocked out as each column leaves the read station. The change of the clock from "off" to "on" signals the central portion of the average data column.

Light is blocked out completely from columns 81 to 84, since this is the period during which the following card is registered into the read station 7 and the card just read is being ejected therefrom. The disc is clear for light to strike the diode 58 at approximately columns 85 and 86 to provide a logic signal which will stop the card control line 30 from rotating until the pressure rolls 140 and 141 return to their normal position and grip the card just registered into the read station in a manner to be described later.

With the clock card disc revolving with the card control line 30, a signal is generated across the photo diode 58 and is amplified in a conventional amplifier and used as logic signals in the data-processing system with which this reader is being used to control loading data from the punched cards. As this operation is not concerned with this specification, it will not be described herein in detail, as this is an operation well known in the computer and data-processing art.

The revolution of the card control line 30 is, of course, determined by the operation of the escapement magnet 56, previously described in conjunction with FIGURE 6.

With the escapement magnet 56 de-magnetized, its armature 55 is forced away from the solenoid's core by a compression spring 34 and into engagement with one of the notches about the periphery of the escapement wheel 52, thereby preventing the card control line 30 from rotating, as previously described. With the escapement magnet energized, its armature 55 is drawn against the solenoid core and, therefore, out of engagement with the teeth of the escapement wheel 52, thereby permitting the card control line 30 to rotate through the clutch mechanism previously described. In a practical application, the energization and de-energization of the escapement magnet 56 were selectively produced through logic circuitry potential levels presented to the terminal 131 of the circuit schematically set forth in FIGURE 24. Without intention or inference of being limited thereto, in the practical application, a negative logic potential level was a logic "true" signal, and a logic potential level of 0 volt, or ground potential, was a logic "false" signal. For purposes of clarity throughout this specification in respect to description of logic circuitry and signal levels, the logic terms "true" and "false" will be used. It is to be specifically understood, however, that the potential levels employed may be discretionary and that other terminology may be used in respect to the logic gating circuitry without departing from this invention.

The circuit which is schematically set forth in FIGURE 24 is arranged in such a manner that the coil 184 of the escapement magnet 56, schematically shown within the dashed rectangle 56, is energized when the logic potential level present at the terminal 170 is "false," ground or zero volt, and is de-energized when the logic potential level present at the terminal 131 is "true," a negative potential. This circuit is conventional in design and, therefore, will not be described in detail in this specification.

If it is desirable, the escapement magnet coil 184 may be returned to a source of negative potential 185, which is of a magnitude greater than that of 180 to insure that the armature of the escapement magnet 56 is operated quickly. By inserting a normally closed switch 175, which is opened by the action of the armature 55, in this circuit, the higher negative value "pull-in" potential of the source 185 may be removed from the circuit and the escapement magnet held in by the current flow through the diode 186 to the source of negative potential 180, which is of a lower magnitude. With less voltage holding the escapement magnet, its drop-out time is faster to assure that it will stop the card control line 30 at the proper column.

The "true" and "false" logic potential levels which are presented to the terminal 131 of the escapement magnet control circuitry set forth in FIGURE 24 are established by a series of gate circuits which are "ORed" together. That is, when all of the gates are "false," the logic potential level signal presented to the terminal 131 is "false." If any one of the gates is "true," the logic potential level signal presented to the terminal 131 is "true." For purposes of this specification, the logic potential level signal presented to the terminal 131 will be termed the logic ESM signal. Depending upon the programs of the data-processing system with which this reader is being used, there may be several gate circuits "ORed" together to produce this logic ESM signal. In one practical application of this invention, there were seven gates "ORed" together to produce the proper operating controls. With other programs and other data-processing requirements, there may be more or fewer gates required to produce the proper ESM signal combinations. Therefore, for purposes of this specification, the use of only three gates "ORed" together to produce the logic ESM signal will be discussed, and they are outlined in schematic and diagrammatic form in FIGURE 25. As other gates which may be required to produce the logic ESM signal are dictated by the program set up in the associated data-processing circuitry, and form no part of the card reader per se, they will not be discussed in detail in this specification.

Referring to FIGURE 25, three "OR" gates 200, 201, and 202 are schematically represented. The input terminals of each of these gates are labeled with the logic term which identifies the logic signal produced by the signal source electrically connected thereto. The source and normal logic potential level of these signals are as follows: Sbc is "true" when the column 81 switch 170 is closed by the cam 63 of the card control line, $\overline{Srr}$ is "true" when the reader ready switch 203, shown in FIGURES 5 and 14, is not operated by the presence of a card in the read station 7, $\overline{Smr}$ is "true" when the "Register" key 204 (FIGURE 5) is in the normal position, Smf is "true" when the "manual-auto" key 205 is in the manual position and has no value or effect on the circuit with the key in the "auto" position, $\overline{Spr}$ is "true" when the switch 220, shown in FIGURE 22, is operated by the compression roll lifting solenoid 142, and CCL is "true" when light from the bulb 62 passes through a slot of the clock card disc and strikes the photo diode 58. As these "OR" gates may be conventional in design, they will not be described in detail except to point out that the gate output logic potential level is "false" if any one of the input circuits has a "false" logic potential level signal impressed thereupon.

FIGURE 26 schematically illustrates the circuitry to the motor 15. An alternating current supply potential, usually 115 to 118 volts, is applied across terminals 210 and 211. Upon the closure of the "On-Off" switch 212, also shown in FIGURE 5, the circuit is completed to the movable contact of a normally open hopper switch 213. This hopper switch 213 is located beneath the table of the card supply hopper 5 and is shown in FIGURE 5. Its operating arm 216 is arranged to protrude up through the table beneath the card hopper 5, where it may be engaged by cards in this hopper, as shown in FIGURE 1. With no cards in the hopper, this switch is open, and the circuitry to the motor is not established. However, assuming that cards are contained in the hopper 5, this switch is closed, and the circuit is completed therethrough to the motor 15.

Upon the closure of the "On-Off" switch 212, another circuit is established through a relay 214, as schematically illustrated in FIGURE 27. It may be pointed out that this relay is not shown in the drawings; however, it is mounted upon a terminal board plate 215, illustrated in FIGURE 5. When this relay is energized, its normally closed contacts 207 open, making the logic term Sro "false," indicating to the logic circuitry of the processing system associated herewith that the reader is on. The normally open contacts 217 are closed, putting a "true" logic potential level upon the movable contact of the reader ready switch 203, which is located in such a manner that its operating arm 236 is engaged by a card in the read station 7. With no card at the read station, this switch is closed from the movable contact to the contact 218, making the logic potential level of logic term $\overline{Srr}$ "true" to indicate that the reader is on with no card in the read station. With a card in the read station engaging the operating arm 236 of the reader ready switch 203, it is closed from the movable contact to the other stationary contact 219, making the logic potential level of logic term level $\overline{Srr}$ "true," to indicate that a card is in the read station ready to be read.

The pressure rolls 140 and 141, which hold the card in intimate contact with the card drive wheels 10 and 12, are controlled by the compression roll lift solenoid 142, as previously described. When the card control line 30 has advanced to its position corresponding to column 81, the lift solenoid switch cam 64 (FIGURE 5) operates and closes the lift solenoid switch 143, thereby completing a circuit from the alternating current supply potential to the coil 149 of this solenoid, as shown in FIGURE 28.

Upon the energization of the coil 149 of the lift solenoid 142, the pressure rolls and the star wheels are raised to allow the next card to be registered into the read station. When the lift solenoid 142 is energized, its plunger pin 144 is withdrawn out of contact with the operating arm 221 of the pressure roll position indicating switch 220, illustrated in FIGURE 22, thereby permitting the normally closed contacts thereof to close, making the logic potential level of logic term $\overline{Spr}$ "true." The pressure roll position indicating switch 220 of FIGURE 22 is located in such a position that the lift solenoid plunger pin 144 is located substantially at the position indicated by the solid circle 144 of FIGURE 22 when the lift solenoid 142 is energized. Upon the relaxation of the lift solenoid 142, the plunger pin 144 is moved toward the solenoid coil 149 a distance great enough to contact the operating arm 221 of the switch 220, as indicated by the dashed circle in FIGURE 22, and opens this switch. When the lift solenoid 142 relaxes as the lobe of the lift solenoid switch cam 63 moves away and allows the lift solenoid switch 143 to open, the solenoid plunger pin 144 of the lift solenoid 142 returns to its original position and opens the switch 220, and the logic potential level of logic term $\overline{Spr}$ goes "false."

Assuming that there are cards in the supply hopper 5 and that the "manual-auto" key 205 is in the "Auto" position, removing logic term S*mf* of the gate 201 from consideration, upon the closure of the "On-Off" switch 212 of FIGURE 26, a circuit is completed to the motor 15 through the switch 212 and the hopper switch 213, and a circuit is also completed to the relay 214, previously described and schematically set forth in FIGURE 27. Upon the energization of the relay 214, its associated normally closed contacts 207 are opened, making the potential level of logic term S*ro* go "false," indicating to the processor that the reader is on, and the movable contact of the reader ready switch 203 goes "true," in a manner previously described. If there is no card in the read station 7, the reader ready switch 203 is closed from the movable contact to normally closed contact 218, and the logic potential level of logic term $\overline{Srr}$ is "true," indicating that the reader is on with no card at the read station. If there is a card in the read station 7, the reader ready switch 203 is closed from its movable contact to the normally open contact 219 by the presence of the card actuating the actuator arm, as previously described, and the logic potential level of logic term $\overline{Srr}$ goes "false," indicating that the reader is on with a card in the read station.

Assuming that there is no card in the read station 7 and that the card control line 30 is in a position other than that corresponding to column 81, logic term $\overline{Srr}$ of the gate 200 (FIGURE 25) is "true," because the reader ready switch 203 is released, logic term $\overline{Smr}$ is "true," as the Register key 204 is in its normal position, and logic term S*bc* is "false," as the column 81 switch 170 is not operated; therefore, the gates 200 and 201 are logically "false." As the pressure roll indicating switch 220 is not operated, term $\overline{Spr}$ is "false," the gate 202 is also logically "false," and logic term ESM is "false." Therefore, the escapement magnet 56 is energized through the circuitry (FIGURE 24) previously described.

With the escape magnet 56 energized, thereby pulling its armature 55 out of the path of the notches in the escapement wheel 52, the card control line 30 is revolved through its associated clutch assembly, previously described. When the card control line 30 has revolved to the position which corresponds to column 81, the lobe of the column 81 switch cam 63 operates the column 81 switch 170 closed (FIGURES 5 and 11), thereby making the logic potential level of logic term S*bc* "true." As logic term S*bc* becomes "true," the gate 200 also becomes "true," since logic terms $\overline{Srr}$ and $\overline{Smr}$ are also "true" at this time, making logic term ESM "true," a condition which demagnetizes the escapement magnet 56, as previously described, and the card control line 30 is stopped in a position corresponding to column 82, until the Register key 204 is depressed.

As the card control line 30 reaches the position corresponding to column 82, the lift solenoid switch cam 64 operates to close the lift solenoid switch 143 (FIGURE 28), thereby energizing the lift solenoid 142 in a manner previously described. As the lift solenoid 142 is energized, its plunger pin 144 operates and closes the pressure roll position indicating switch 220, in a manner previously described, thereby making the logic potential level of logic term $\overline{Spr}$ "true." In this regard, it may be well to point out again that light is blocked from the diode 58 by the emulsion on the card clock disc plate during that portion which corresponds to columns 81 through 84, a condition which makes the logic potential level of logic term CCL of the gate 202 "false" during this period.

Upon the depression of the Register key 204 (FIGURES 5 and 29), the circuit through its movable contact 241 and stationary contact 222 is opened, thereby making the logic potentential level of logic term $\overline{Smr}$ of the gates 200 and 201 "false." As this logic term goes "false," the gates 200 and 201 also go "false," a condition which makes logic term ESM "false," thereby energizing the escape magnet 56, in a manner previously described. Upon the energization of the escape magnet 56, the card control line 30 is permitted to operate through its clutch assembly, and the column 81 switch cam 63 releases the column 81 switch 170, making the logic potential level of logic term S*bc* "false," which maintains logic term ESM "false" through the gates 200 and 201, after the Register key 204 has been released.

As the card control line 30 revolves through its position corresponding to column 86, the lobe of the lift solenoid switch cam (FIGURES 5 and 12) releases the lift solenoid switch 143. However, just before the lift solenoid 142 releases, the logic potential level CCL goes "true" as the card clock disc 65 passes the light for the light bulb 62 to the photo diode 58. With this term "true," the gate 202 is "true"; therefore term ESM is "true," a condition which de-energizes the escapement magnet 56, and the card control line 30 is stopped, in a manner previously described. However, as the pressure rolls drop to their normal position and the plunger pin 144 of the lift solenoid is withdrawn from contact with the operating arm 221 of the pressure roll position indicating switch 220, the logic potential level of logic term $\overline{Spr}$ goes "false," the gate 202 again goes "false," and escapement continues.

At the position of the card control line 30 which corresponds approximately to column 28, the lobe of the clutch trip cam 60 operates the clutch trip arm 71 (FIGURES 5 and 11), which engages the dog of the clutch pawl 39 in a notch of the clutch wheel 21 (FIGURE 11) in a manner previously described. Upon the engagement of this clutch member, the card feed mechanism previously described is operated to feed one card from the bottom of the stack in the supply hopper 5 onto the read table 6, where it is registered against the stop 136 (FIGURE 9). As the detail of this mechanism has been previously described, in the mechanical portion of this specification, it will not be gone into in detail again at this time.

When the card control line 30 has advanced to its position which corresponds to column 81, the lobe of the column 81 switch cam 63 again operates to close the column 81 switch 170, in which condition the logic potential level of logic term S*bc* of the gates 200 and 201 is "true," as previously described, and, substantially simultaneously, the lobe of the lift solenoid switch cam 64 operates to close the lift solenoid switch 143, thereby energizing the lift solenoid switch 142, which operates to lift the pressure rolls 140 and 141 and the star wheel sensors out of the path of a card to be registered in the read station 7. Upon energization of the lift solenoid 142, its solenoid plunger pin 144 operates the pressure roll position indicating switch 220 to make the logic potential level of logic term $\overline{Spr}$ come "true," in a manner previously described.

Under these conditions, the gate 200 is true, as the reader ready switch 203 is unoperated and the Register key 204 is in the normal position; therefore, logic term ESM is "true," a condition which produces the de-energization of the escape magnet 56, as previously described, and the card control line is stopped at its position corresponding to column 82 until the Register key 204 is again depressed.

Upon depression of the Register key 204, the logic potential level of logic term $\overline{Smr}$ goes "false," in a manner previously described, thereby making the gates 200 and 201 "false." Therefore, logic term ESM is also "false," which creates the energization of the escapement magnet 56, in a manner previously described, and the card control line 30 is permitted to turn. Shortly after the column 82 position, the card registration cam 61 operates the card registration mechanism, comprising the cam arm 80 (FIGURE 7), the card pusher link 81 (FIGURES 6 and 7), and the card pusher arm 82, in a manner previously described in the mechanical description of this specification. This operation pushes the card that has just been registered against the stop 136 on the table 6 toward the read station 7. As the card approaches the read station 7, it operates the operating arm of the reader ready switch 203, which transfers the logic potential level of the movable arm from the stationary contact 218 to the stationary contact 219 thereof, thereby making the logic potential level of logic term $\overline{Srr}$ "false." Under this condition, the gate 200 is false, permitting the card control line 30 to turn. As the card control line 30 passes through its position corresponding to column 86, the lift solenoid switch cam 64 releases the lift solenoid switch 143, and the lift solenoid 142 relaxes, permitting the pressure rolls to drop down and release the pressure roll position indicating switch 220, allowing the logic potential level of term $\overline{Spr}$ to go "false." However, as previously pointed out, just before the lift solenoid 142 relaxes and releases the pressure roll position indicating switch 220, logic term CCL goes "true" because the card clock disc passes the light from the light bulb 62 to the photo diode 58. Therefore, the gate 202 momentarily goes "true" at this time, momentarily stopping the rotation of the card control line 30. This momentary stop is necessary for the card to be properly registered in the read station 7. As term $\overline{Spr}$ goes "false" a short time later, the card control line 30 continues to turn and advance the card.

Under these conditions, with the "manual-auto" key 205 in the automatic position, the reader continues to run, alternately feeding cards and registering these cards into the read station until the reader is stopped in accordance with the program punched into the program disc, as previously described. Should the "manual-auto" key 205 be in the manual position, the logic potential level of term Smf is always "true"; therefore, the reader would always stop at column 82, and a card to be read must be manually placed on the table 6 and registered to the read station by depressing the Register key 204 in a manner previously described.

When the lift solenoid 142 is energized and the pressure rolls 140 and 141 are raised and release their grip on the card between the card drive wheels 10 and 12, a card ejection roll 11 (FIGURE 5) continues to move the card out of the read station and into the receiving hopper 9. The card ejection roll 11 is driven continuously by the gear 50 on the clutch assembly, as shown in FIGURES 5 and 18, and an idler gear 225 (FIGURE 8).

It may be noted in FIGURE 5 that there is an additional key, entitled a "Skip" key, illustrated. The depression of this key operates with logic circuitry within the associated processor to skip certain fields of the card which need not be read with a specific program. As this operation does not alter the mechanical operation of the reader as just described, it will not be gone into in detail at this time.

The manual-auto key 205 mechanically operates a link 252, which revolves the pawl 250 of FIGURE 11 to the left, or counter-clockwise. It may be noted that the pawl 250 engages a tip of the trip pawl 75 and, when rotated to the left, carries the clutch trip pawl 75 along in a clockwise direction around its pivot 251. This operation removes the shoulder 74 of the trip pawl 75 out of engagement with the square stud 73. Therefore, when the clutch trip arm 71 is operated by the lobe of the clutch trip cam 60, the square stud 73 does not carry the trip pawl 75 with it; therefore, the card feed clutch assembly is not operated. The linkage for operating the pawl 250 is shown in FIGURE 9.

While a preferred embodiment of the present invention has been shown and described, it will be obvious to those skilled in the art that various modifications and substitutions may be made by those skilled in the art without departing from the spirit of the invention, which is to be limited only within the scope of the following claims.

What is claimed is:

1. A perforated card reader comprising in combination a driving motor, a supply hopper for accommodating a stack of cards to be read, a read station, sensing means at said read station for sensing perforations in said cards, a selectively rotatable control line means which rotates one revolution for each card for establishing the timing and sequence of operations for said reader, a card feed mechanism for feeding one card at a time from the bottom of said stack in said supply hopper, card feed mechanism clutch means for applying and releasing the power from said motor to said card feed mechanism, control line clutch means for applying and releasing the power from said motor to said control line means, at least two card drive wheels rotatable with said control line means for transporting said cards through said read station, a pressure roller for each of said card drive wheels for maintaining said cards in intimate contact with said respective card drive wheels, a card feed mechanism clutch trip cam rotatable with said control line for activating said card feed mechanism, a card registration mechanism for registering said cards into said read station, a card registration mechanism cam rotatable with said control line for operating said card registration mechanism, a lift solenoid for raising said pressure rollers as said card is being registered into said read station, a lift solenoid switch cam rotatable with said control line for operating said lift solenoid, and means for selectively operating said control line clutch means whereby said control line may be selectively rotated to produce, through the said cams rotatable therewith, the sequence of operations necessary to feed said cards onto said card table and through said read station.

2. A perforated card reader comprising in combination a driving motor, a supply hopper for accommodating a stack of cards to be read, a read station, sensing means at said read station for sensing perforations in said cards, a receiving hopper, a selectively rotatable control line means which rotates one revolution for each card for establishing the timing and sequence of operations for said reader, a card feed mechanism for feeding one card at a time from the bottom of said stack in said supply hopper, card feed mechanism clutch means for applying and releasing the power from said motor to said card feed mechanism, control line clutch means for applying and releasing the power from said motor to said control line means, at least two card drive wheels rotatable with said control line means for transporting said cards through said read station, a pressure roller for each of said card drive wheels for maintaining said cards in intimate contact with said respective card drive wheels, a continuously rotating card ejection roller for ejecting said cards from said read station into said receiving hopper, a card feed mechanism clutch trip cam rotatable with said control line for activating said card feed mechanism, a card registration mechanism for registering said cards into said read station, a card registration mechanism cam rotatable with said control line for operating said card registration mechanism, a lift solenoid for raising said pressure rollers as said card is being registered into said read station, a lift solenoid switch cam rotatable with said control line for operating said lift solenoid, a clock disc rotatable with said control line means for producing timing signals as said control line rotates, and means for selectively operating said control line clutch means whereby said control line may be selectively rotated to produce, through the said cams rotatable therewith, the sequence of operations necessary to feed said cards onto said card table and through said read station.

3. A perforated card reader comprising in combination a driving motor, a supply hopper for accommodating a stack of cards to be read, a card table, a read station, sensing means at said read station for sensing perforations in said cards, a receiving hopper, a selectively rotatable control line means which rotates one revolution for each card for establishing the timing and sequence of operations for said reader, a card feed mechanism for feeding one card at a time from the bottom of said stack in said supply hopper onto said card table, card feed mechanism clutch means for applying and releasing the power from said motor to said card feed mechanism, control line clutch means for applying and releasing the power from said motor to said control line means, at least two card drive wheels rotatable with said control line means for transporting said cards through said read station, a pressure roller for each of said card drive wheels for maintaining said cards in intimate contact with said respective card drive wheels, a card feed mechanism clutch trip cam rotatable with said control line for activating said card feed mechanism, a first card registration mechanism for registering each card onto said card table after it has been fed from the bottom of said stack of cards by said card feed mechanism, a second card registration mechanism for registering said cards from said card table into said read station, a second card registration mechanism cam rotatable with said control line for operating said second card registration mechanism, a lift solenoid for raising said pressure rollers as said card is being registered into said read station, a lift solenoid switch cam rotatable with said control line for operating said lift solenoid, a clock disc rotatable with said control line means for producing timing signals as said control line rotates, and means for selectively operating said control line clutch means whereby said control line may be selectively rotated to produce, through the said cams rotatable therewith, the sequence of operations necessary to feed said cards onto said card table and through said read station.

4. A perforated card reader comprising in combination a driving motor, a supply hopper for accommodating a stack of cards to be read, a card table, a read station, sensing means at said read station for sensing perforations in said cards, a receiving hopper, a selectively rotatable control line means which rotates one revolution for each card for establishing the timing and sequence of operations for said reader, a card feed mechanism for feeding one card at a time from the bottom of said stack in said supply hopper onto said card table, card feed mechanism clutch means for applying and releasing the power from said motor to said card feed mechanism, control line clutch means for applying and releasing the power from said motor to said control line means, at least two card drive wheels rotatable with said control line means for transporting said cards through said read station, a pressure roller for each of said card drive wheels for maintaining said cards in intimate contact with said respective card drive wheels, a continuously rotating card ejection roller for ejecting said cards from said read station into said receiving hopper, a card feed mechanism clutch trip cam rotatable with said control line for activating said card feed mechanism, a first card registration mechanism for registering each card onto said card table after it has been fed from the bottom of said stack of cards by said card feed mechanism, a second card registration mechanism for registering said cards from said card table into said read station, a second card registration mechanism cam rotatable with said control line for operating said second card registration mechanism, a lift solenoid for raising said pressure rollers as said card is being registered into said read station, a lift solenoid switch cam rotatable with said control line for operating said lift solenoid, a clock disc rotatable with said control line means for producing timing signals as said control line rotates, and means for selectively operating said control line clutch means whereby said control line may be selectively rotated to produce, through the said cams rotatable therewith, the sequence of operations necessary to feed said cards onto said card table and through said read station.

References Cited
UNITED STATES PATENTS 2,359,670 10/1944 Page _____ 235—61.7 X
2,995,241 8/1961 Klotz _____ 235—61.7

MAYNARD R. WILBUR, *Primary Examiner.*

T. J. SLOYAN, *Assistant Examiner.*